United States Patent
Heintz et al.

(10) Patent No.: US 10,015,628 B1
(45) Date of Patent: Jul. 3, 2018

(54) DIGITAL LEGACY AND LOCATION SERVICES FOR BURIAL SITES

(71) Applicant: Eternal Legacy Company, LLC, Rocklin, CA (US)

(72) Inventors: Mark Heintz, Rocklin, CA (US); Juan Martinez, Rocklin, CA (US); Greg Marmulak, Fort Collins, CO (US)

(73) Assignee: Eternal Legacy Company, LLC, Rocklin, CA (US)

( * ) Notice: Subject to any disclaimer, the term of this patent is extended or adjusted under 35 U.S.C. 154(b) by 0 days.

(21) Appl. No.: 15/865,298

(22) Filed: Jan. 9, 2018

(51) Int. Cl.
| | |
|---|---|
| *H04W 4/02* | (2018.01) |
| *G06F 17/30* | (2006.01) |
| *G06T 19/00* | (2011.01) |
| *H04W 4/024* | (2018.01) |
| *H04W 4/021* | (2018.01) |

(52) U.S. Cl.
CPC ........ *H04W 4/021* (2013.01); *G06F 17/3005* (2013.01); *G06F 17/30041* (2013.01); *G06T 19/006* (2013.01); *H04W 4/024* (2018.02)

(58) Field of Classification Search
CPC ... H04W 4/021; H04W 4/024; G06F 17/3005; G06F 17/30041; G06T 19/006
See application file for complete search history.

(56) References Cited

U.S. PATENT DOCUMENTS

| | | | | |
|---|---|---|---|---|
| 7,636,991 | B1* | 12/2009 | Scalisi | E04H 13/00 27/1 |
| 9,160,782 | B1* | 10/2015 | Meagher | H04L 67/18 |
| 9,200,469 | B1* | 12/2015 | Mindrum | G06F 17/3087 |
| 2008/0141508 | A1* | 6/2008 | Silva | H04N 7/18 27/1 |
| 2013/0151554 | A1* | 6/2013 | Neal | G06F 17/30277 707/769 |
| 2016/0150018 | A1* | 5/2016 | Botier | H04L 67/1097 709/214 |
| 2016/0275103 | A1* | 9/2016 | Robinson | G06F 17/30241 |
| 2017/0154465 | A1* | 6/2017 | Calvert | G06T 19/006 |
| 2017/0221239 | A1* | 8/2017 | Lintz | G06T 11/206 |

* cited by examiner

*Primary Examiner* — Brandon J Miller
(74) *Attorney, Agent, or Firm* — Georgiy L. Khayet

(57) ABSTRACT

Methods and systems for providing location services for a burial site are disclosed. An example method comprises receiving user identifying information from a mobile application installed on a mobile device, matching a user associated with the mobile application to the burial site, receiving location data from the mobile device, determining that the mobile device is within a predetermined geofence associated with a location of the burial site, and providing to the user a guidance to the location of the burial site using the mobile application. The method may also include automatically retrieving and presenting to the user, via the mobile application, a digital legacy of a deceased person associated with the burial site. The method may also include visualizing, via the mobile application, the location of the burial site as an avatar associated with the deceased person using Augmented Reality techniques.

16 Claims, 4 Drawing Sheets

DIGITAL LEGACY AND LOCATION SERVICES FOR BURIAL SITES

TECHNICAL FIELD

This disclosure generally relates to burial and gravesite location services. More particularly, this disclosure relates to methods and systems for providing digital legacy data services and location services for burial sites, including traditional burial sites and natural burial sites that lack identification marks such as gravestones.

DESCRIPTION OF RELATED ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Natural or "green" burial services have been steadily growing in interest and demand because they prevent environmental damage. In contrast to conventional funeral techniques, natural burial is the interment of the deceased individual in the soil without inhibiting decomposition; rather, it allows the body to decompose naturally. The natural burial methods involve preparing the body of the deceased for funeral without using chemical preservatives (e.g., embalming fluids), which are harmful to the environment. The body can be buried without a coffin or in a biodegradable coffin, casket, or shrouds in lieu of traditional coffins, which are harmful to the environment.

Natural burials can take place both on private land and in a specially designated cemetery. While traditional cemeteries have grave markers, such as headstones, natural burial sites lack any physical markers to identify the gravesite location of the deceased. Even when geographical coordinates of the burial site are known, some people can find it difficult or even impossible to locate the burial site. Furthermore, even if a physical marker is present at the burial site, the information displayed on the physical marker is typically limited to name and dates.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure is concerned with digital legacy services and location services for burial sites that lack physical markers, such as headstones, to identify the location and provide information concerning the deceased. The methods and systems disclosed herein support the concept of natural ("green") burial to reduce environmental damage caused by traditional burial methods. The present technology allows people to prepare for natural burial by purchasing a burial site from an operator of the burial site through a website or a mobile application installed on a mobile device. The burial site can be characterized by its location and can be identified by its geographical coordinates, for example, Global Positioning System (GPS) coordinates.

The purchaser of the burial site can also be able to create a "digital legacy" using the website or the mobile application. The digital legacy can be best characterized as a digital profile associated with the deceased and/or the burial site of the deceased. It can be designed to honor and celebrate the life of deceased and may include text, images, video, audio, or media content. For example, the digital legacy can include multimedia content for an in memoriam or biography of the deceased. The digital legacy can be stored in an online database such that it can be remotely modified and retrieved by the mobile application. The digital legacy is further virtually linked (geo-tagged) or associated with the burial site of the deceased person. The mobile application can present the digital legacy to a user, for example, when the user is at the burial site.

After the deceased person is buried according to the natural burial techniques mentioned above, people can easily find the burial site location even when no physical marks, like gravestones, are used to identify the location. Particularly, when the user of a mobile device wants to visit the burial site, the mobile application may provide directions or guidance to the user. When the individual gets closer to the burial site and comes within a predetermined distance of the burial site, the mobile device may provide acoustic, visual, or tactile alerts. The guidance and directions to the burial site may also be provided using Augmented Reality (AR) techniques. The mobile device may also obtain and present the digital legacy to the user when the user is at or in a proximity of the burial site.

According to embodiments disclosed herein, one aspect of the present technology includes a method for providing location services for a burial site. The method comprises the steps of receiving user identifying information from a mobile application installed on a mobile device, matching a user associated with the mobile application to the burial site based on the user identifying information, receiving location data from the mobile device, determining that the mobile device is within a predetermined geofence associated with a location of the burial site based on the location data, and providing the user, via the mobile application, with a guidance to the location of the burial site.

Optionally, the method may include the step of automatically retrieving, via the mobile application, a digital legacy of a deceased person associated with the burial site upon determination that the mobile device is within the predetermined geofence associated with the location of the burial site. The method may also include the step of visualizing, via the mobile application, the location of the burial site of the deceased person as an avatar associated with the deceased person, wherein the avatar is visualized via the mobile application using the AR techniques against a natural background of the burial site.

According to embodiments disclosed herein, another aspect of the present technology includes a system for providing location services for a burial site. The system comprises a receiving a module configured to receive user identifying information and location data from a mobile application installed on a mobile device; a matching module configured to match, based on the user identifying information, a user associated with the mobile application to the burial site; a processing module configured to determine, based on the location data, that the mobile device is within a predetermined geofence associated with a location of the burial site; and a navigation module configured to provide to the user, based on the determination that the mobile device is within the predetermined geofence, via the mobile application, a guidance to the location of the burial site.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example, and not by limitation in the figures of the accompanying drawings, in which like references indicate similar elements.

DETAILED DESCRIPTION OF EXAMPLE EMBODIMENTS

Figure 1:
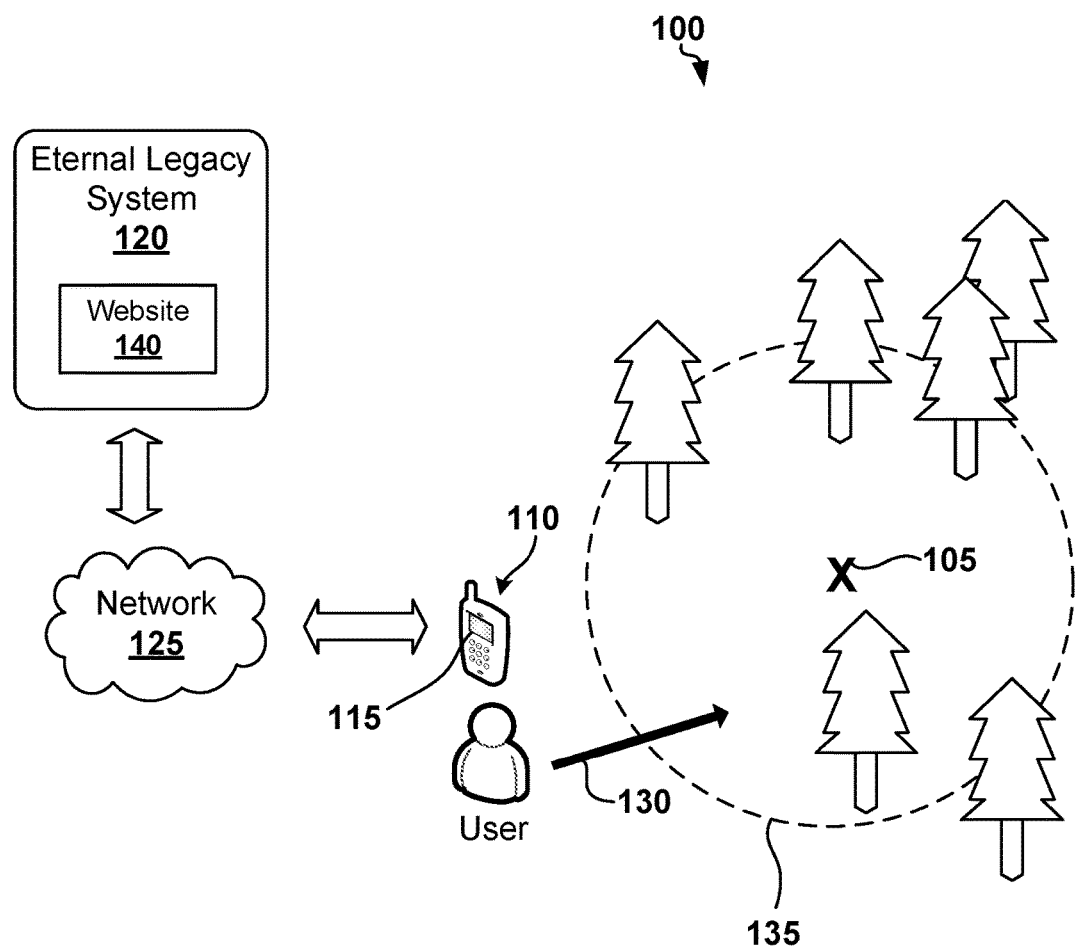
FIG. 1 shows an example system architecture for implementing methods and systems for providing location services for a burial site, according to one example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The technology of this disclosure is concerned with digital legacy information services and location services for burial sites. The technology is especially suitable for natural or "green" burial methods, but is not necessarily limited to such. For example, the present technology can allow locating burial sites even when they lack physical marks such as gravestones, headstones, and the like.

There are several aspects of this technology. First, there is provided an online e-commerce platform (website) that enables consumers to purchase natural burial sites. Second, the purchasers and associated users can create, store, and share their online digital legacy related to persons to be buried in the purchased burial sites. The digital legacy is a digital profile that can include text, images, video, audio, or any other type of media content. For example, the digital legacy can include an obituary, memorial profile of a deceased person, a social network profile, and the like. Third, there is provided a mobile application that can be installed on a mobile device. The mobile application can assist its users with locating the burial sites by tracking the location of the mobile device and determining when they are within a predetermined geofence of the burial site. The mobile application can be designed to provide alerts to the users when they are near the burial site, provide directions or guidance to the location of the burial site, and present, to the users, the digital legacy associated with the burial site. These and other aspects of the technology are disclosed below as embodiments.

The following detailed description of embodiments includes references to the accompanying drawings, which form a part of the detailed description. Note, the features, structures, or characteristics of embodiments described herein may be combined in any suitable manner. In this disclosure numerous specific details are provided, such as examples of programming, software modules, user selections, network transactions, hardware modules, hardware circuits, hardware chips, and so forth, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will be presented with reference to accompanying drawings which show blocks, components, circuits, steps, operations, processes, algorithms, and the like. These elements may be implemented using electronic hardware, computer software, or any combination thereof. Whether such elements are implemented as hardware or software depends upon the application and design constraints imposed on the overall system. The electronic hardware includes one or more processors such as microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. The processors may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise. If the functions described herein are implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a"

shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The term "or" is used to refer to a nonexclusive "or," such that "A or B" includes "A but not B," "B but not A," and "A and B," unless otherwise indicated.

The term "mobile device" shall be construed to mean a personal and portable consumer electronic device suitable for data processing and data displaying. Some examples of the mobile device include, but not limited to, a cellular phone, smart phone, tablet personal computer (PC), laptop PC, portable game controller, portable media device, portable computing device, and so forth. The mobile device may have one or more mobile applications installed thereon. The term "mobile application" may be also construed as a software application or simply software suitable for performing some or all of methodologies disclosed herein.

The term "user" shall be construed to mean an individual that uses the mobile device and any of the mobile applications installed thereon. The user can also be an individual that uses a website associated with an eternal legacy system as discussed below. The term "user" may be also referred herein to as "individual," "person," "customer," and "purchaser."

The term "location data" shall be construed to mean digital information characterizing a geographical location of a user, mobile device, or burial site (depending on a context). The location data includes positional information or geographical coordinates obtained using a satellite navigation system, such as the GPS or Galileo Global Navigation Satellite System (GNSS), or triangulation location methods. The location data of mobile device can be determined by the mobile device itself or by a remote device such as a server.

The term "geofence" shall be construed to mean a virtual perimeter or boundary around a predetermined location such as a burial site. The geofence can include a set of coordinates determining the location of a virtual perimeter. The form of geofence can include a circle, a square, a triangle, and the like. In one example, a geofence around a natural burial site is a virtual circle with a 100-feet diameter.

The term "burial site" shall mean a burial place of a deceased person or animal (e.g., a pet). For example, the burial site can be a piece of land, but not necessarily. The terms "burial site," "burial plot," "gravesite," "cemetery," and the like may be used interchangeably and should mean the same.

The term "avatar" shall be construed to mean a virtual representation of a deceased person or a burial site. The avatar can be a virtual two-dimensional or three-dimensional model or image (for example, an image of the deceased person). The avatar can be displayed on a screen of a mobile device using Augmented Reality (AR) or Virtual Reality (VR) methods.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows an example system architecture 100 for implementing methods and systems for providing location services for a burial site 105. In the shown embodiment, burial site 105 is a gravesite of a deceased person. Burial site 105 can be a parcel of land that was purchased from an operator of burial sites or cemetery by the deceased person or any other individual.

System architecture 100 includes a mobile device 110 that is operated by a user. The user intends to locate burial site 105, which may lack any physical identification marks such as a headstone, and may also desire to get access to a digital legacy of the deceased person. Mobile device 110 is a smart phone or a tablet computer, for example. One or more mobile applications can be installed on mobile device 110. A mobile application 115 installed on mobile device 110 can be designed to facilitate implementation of the methods for providing location services for burial sites, as disclosed herein. Mobile application 115 can be downloaded by the user using a hyperlink provided by a designated user. The designated user can be pre-selected by the deceased person, and may include, for example, an estate administrator, attorney-in-fact, relative or family member of the deceased person, and so forth.

Still referring to FIG. 1, system architecture 100 includes an eternal legacy system 120, which can be implemented as a back-end service running on one or more servers. Eternal legacy system 120 can include a system for providing location services for burial sites and a website (online portal) 140. As such, eternal legacy system 120 (or "system 120" for simplicity) can implement one or more operations of methods for providing location services for burial sites as disclosed herein. Furthermore, as shown in FIG. 1, mobile device 110 is in operative communication with system 120 over one or more communications networks 125. As such, mobile application 115 of mobile device 110 can exchange data with system 120.

As discussed above, the present technology is concerned with location services to locate certain burial sites. The user of mobile device 110 can generate a request for directions to the location of burial site 105 using mobile application 115. The request is then delivered to system 120, which responds back with directions or navigational data to mobile device 110. The directions or navigational data are then presented to the user via mobile application 115 or any other suitable mobile application.

Furthermore, in some embodiments, the user may search for one or more burial site locations. Specifically, the user may create a request to perform a search for the location of burial site 105 of a deceased person using mobile application 115. The request can include one or more predetermined search criteria selected by the user, including, for example, a name, a date of birth, a date of death, a name of a cemetery, or a geographical location. The request is then sent by mobile device 110 to system 120. When the request is received by system 120, system 120 performs a search based on the search criteria provided by the user. System 120 then provides search results back to mobile application 115 for presentation to the user. The search results can include none, one, two, or more burial site locations depending on the search criteria.

Additionally, system 120 can allow the user to search for a digital legacy of the deceased person (or optionally search for a digital legacy of more than one deceased). Similarly, the user can generate a search request using one or more search criteria (e.g., a name of deceased, dates of birth and death, etc.) and send the search request to system 120 using mobile application 115. After system 120 performs the search, it delivers its search results back to mobile application 115 for presenting to the user via visual or acoustic means. In some embodiments, each digital legacy may have privacy settings allowing only certain users to search for and access the digital legacy.

Still referring to FIG. 1, when the user obtains location information of burial site 105, he can move in a general direction 130 towards the burial site 105. Mobile device 110 determines its current geographical location and transmits such location data to system 120. When system 120 obtains the location data from mobile device 110, system 120 can determine whether the user is approaching burial site 105. System 120 can also cause mobile device 110 to present the user with additional directions or guidance to burial site 105. For example, a digital map with directions or navigational marks can be displayed on a screen of mobile device 110.

System 120 then determines whether the user crossed a geofence 135 associated with burial site 105. If it is determined that the user with mobile device 110 has crossed geofence 135 (i.e., it is determined that the user is within a predetermined distance from burial site 105), system 120 causes mobile device 110 to provide alert signals to the user. The alert signals can include visual signals, audio signals, tactile signals, and the like. The diameter, dimensions, or perimeter of geofence 135 can be predetermined by customers, users, or operators of the system. As such, geofence 135 is within a certain distance of location of burial site 105 (e.g., hundred feet) or within a certain predetermined area including burial site 105.

In some embodiments, there can be provided two or more concentric geofences of different diameters or variously shaped areas within other areas. Accordingly, the system can be programmed to provide one type of alert signal when a first (larger) geofence is crossed by the user, and provide a second type of alert signal when a second (smaller) geofence is crossed by the user.

In addition to presenting the guidance and directions to the user, the system can cause mobile device 110 to identify the location of burial site 105 with an avatar using AR methods. For example, the avatar can be a graphical image, multimedia image, or virtual model of the deceased person that is displayed on a screen of mobile device 110 against a natural background of burial site 105 (where the natural background is captured by a camera of mobile device 110).

Furthermore, mobile application 115 can be designed to retrieve a digital legacy of the deceased person from system 120 and present it to the user via a browser or mobile application 115. In certain embodiments, mobile application 115 can automatically retrieve the digital legacy upon determining that mobile device 110 has crossed geofence 135 and is within a predetermined location from burial site 105.

Figure 2:
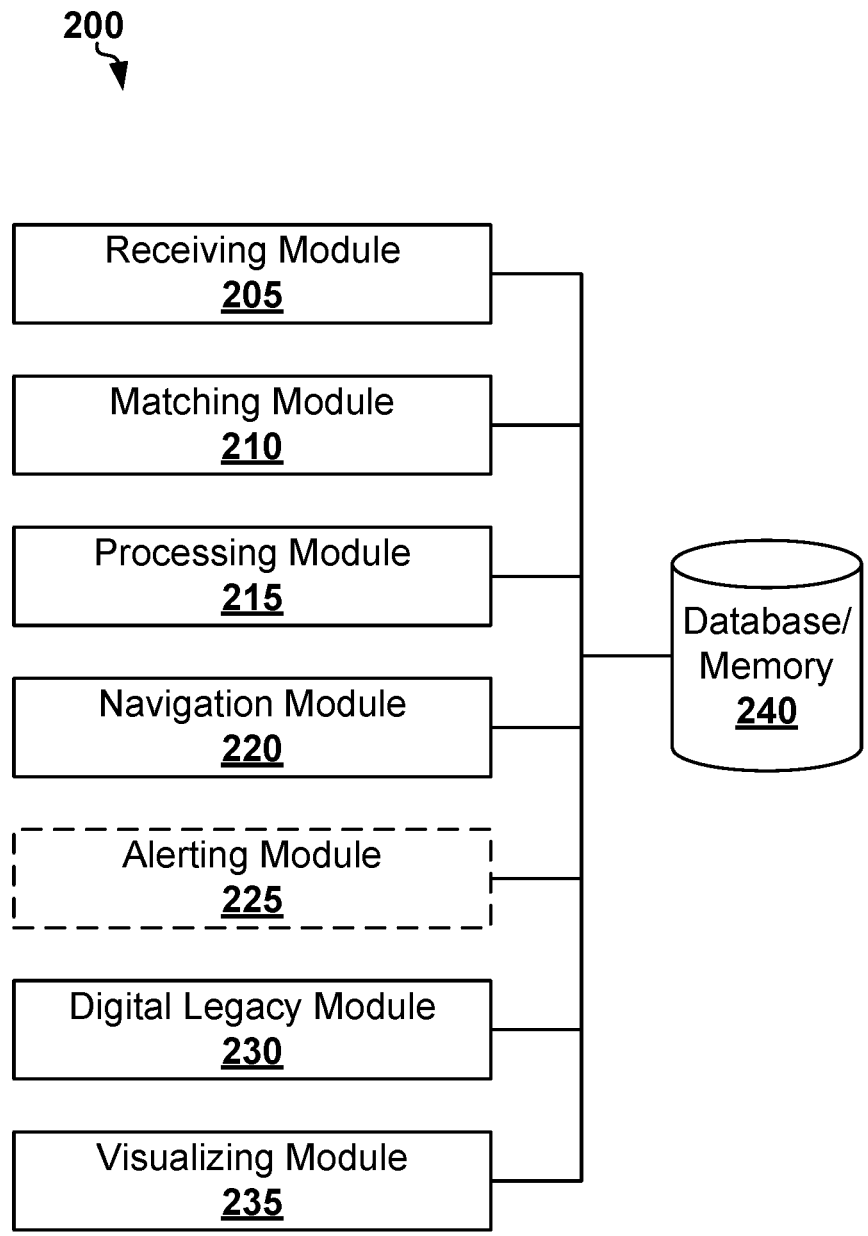
FIG. 2 shows an example system for implementing methods for providing location services for a burial site, according to one example embodiment.

FIG. 2 shows an example system 200 for implementing methods for providing location services for a burial site, according to one example embodiment. It should be understood that system 200 is shown to merely facilitate understanding of the technology presented herein and other implementations are possible. System 200 may be an instance of eternal legacy system 120 shown in FIG. 1. System 200 is a server-side solution, which optionally can be implemented using "cloud" or distributed computing techniques. As such, system 200 can perform back-end functions for mobile application 115 installed on mobile device 110.

As shown in FIG. 2, system 200 includes a plurality of modules. Each module can be implemented using electronic hardware, computer software, or any combination thereof. Whether such elements are implemented as hardware or software depends upon a particular application and system design. Modules of system 200 are operatively interconnected to enable implementation of the methods disclosed herein. Moreover, certain modules of system 200 may be remote modules. For example, one or more modules of system 200 can be implemented in mobile application 115.

System 200 includes a receiving module 205, such as a network interface or software-based procedure, configured to receive user identifying information from mobile application 115 installed on mobile device 110. The user identifying information can include a user identifier (ID), user credentials (e.g., a login and password), session ID, session token, or any other data or message suitable to identify the user or user's session. In some embodiments, mobile application 115 and system 200 can be configured to authenticate the user based on user credentials or biometric data before other operations are performed.

Receiving module 205 can be further configured to receive location data from mobile device 110. As discussed above, the location data characterizes the current geographical location of user or mobile device 110. The location data can include geographical coordinates such as GPS coordinates or GNSS coordinates. The location data can be generated by a GPS module of mobile device 110.

System 200 can further include a matching module 210 that is configured to match the user associated with mobile application 115 to burial site 105. The matching is performed based on the user identifying information received by receiving module 205. For example, matching module 210 can obtain a user ID from the user identifying information and uses the user ID to search records in a lookup table stored in a database 240. The lookup table records associate or link a plurality of user IDs with a plurality of burial sites or a plurality of deceased people. Accordingly, for each user ID, the lookup table can match one or more burial sites, where each of burial sites is corresponded to a deceased person.

System 200 can also include a processing module 215 that is configured to determine that mobile device 110 is within predetermined geofence 135 associated with the location of burial site 105. The determination is made by comparing the location data of mobile device 110 with the coordinates of predetermined geofence 135. If it is determined that a current location of mobile device 110 is within the perimeter of predetermined geofence 135, processing module 215 makes a conclusion that the user is approaching burial site 105 and is positioned inside geofence 135.

System 200 can further include a navigation module 220, which can be configured to provide, to the user, via mobile application 115, a guidance to the location of burial site 105. The guidance can be provided or not provided based on the determination that mobile device 110 is within the predetermined geofence 135. For example, the guidance is provided to the user only when mobile device 110 is outside of predetermined geofence 135. Alternatively, the guidance can be provided to the user only when mobile device 110 is within predetermined geofence 135. In some other embodiments, the form of guidance can be based on the determination that mobile device 110 is within predetermined geofence 135. For example, directions or a map can be displayed on a screen of mobile application 115 when mobile device 110 is outside of predetermined geofence 135. However, when mobile device 110 is within predetermined geofence 135, an avatar or more detailed directions can be presented to the user via mobile application 115.

Still referring to FIG. 2, system 200 may, optionally, include an alerting module 225 that is configured to provide, via mobile device 110, one or more alerts to indicate to the user is approaching location of burial site 105. The alerts can be provided based on the determination that mobile device 110 is within geofence 135. For example, the alerts can be generated only after mobile device 110 crosses geofence 135 towards burial site 105. The alerts can include any suitable displayable information, audio information, multimedia information, or tactile information (e.g., a short vibration).

System 200 may further comprise a digital legacy module 230, which is configured to retrieve, via mobile application 115, a digital legacy of the deceased person associated with burial site 105. The retrieval can be initiated upon a user request or automatically upon determination that mobile device 110 is within the predetermined geofence 135. A digital legacy can be stored in database 240.

In yet additional embodiments, system 200 further includes a visualizing module 235 that is configured to visualize the location of burial site 105 on a screen of mobile application 115. Such a location can be visualized as a two-dimensional or three-dimensional image, video, or multimedia element. Alternatively, the location of burial site 105 can be visualized by module 235 as an avatar associated with the deceased person. For example, the avatar can be a two-dimensional or three-dimensional virtual model of the deceased person. In some embodiments, the avatar is visualized via mobile application 115 using AR techniques against a natural background of burial site 105. The natural background is obtained by a camera of mobile device 110.

System 200 may also include database or memory 240 for storing digital legacy data, user profiles, location data of burial sites, deceased people data, user IDs, burial site IDs, user settings, user preferences, computer instructions, lookup tables, and any other data needed to enable the operation of system 200 as discussed herein. System 200 can also host website 140 to enable the users to purchase burial sites and create digital legacy.

Figure 3:
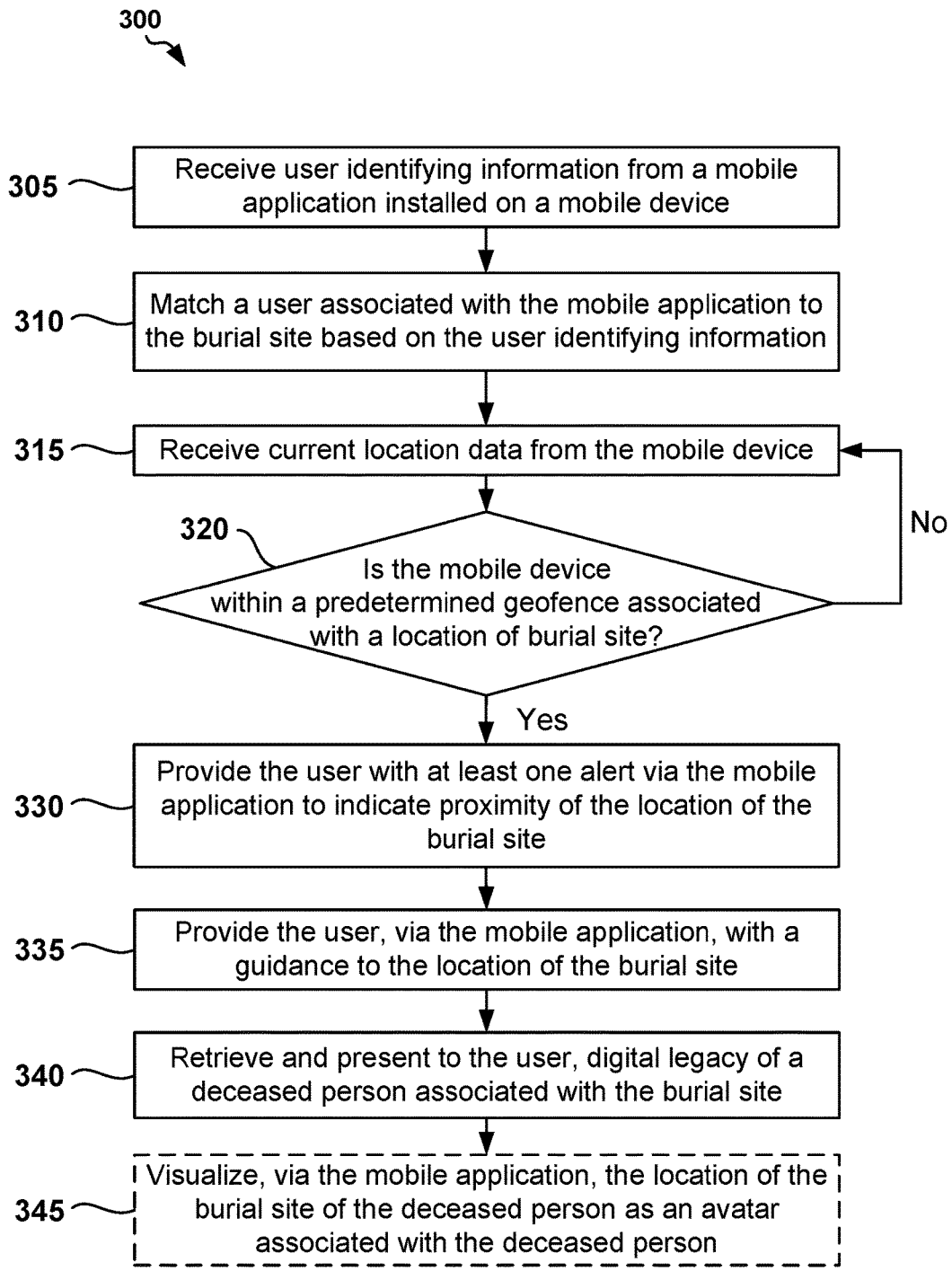
FIG. 3 shows an example process flow diagram showing a method for providing location services for a burial site, according to an example embodiment.

FIG. 3 shows an example process flow diagram showing a method 300 for providing location services for a burial site, according to an example embodiment. Method 300 may be performed by processing logic that comprises hardware (e.g., decision-making logic, dedicated logic, programmable logic, application-specific integrated circuit (ASIC), and microcode), software (such as software run on a general-purpose computer system or a dedicated machine), or a combination of both. In one example embodiment, the processing logic refers to system 120 or 200. Below recited operations of method 300 may be implemented in an order different than described and shown in the figure. Moreover, method 300 may have additional operations not shown herein, but which can be evident to those skilled in the art from the present disclosure. Method 300 may also have fewer operations than outlined below and shown in FIG. 3.

Method commences at block 305, where receiving module 205 receives user identifying information (e.g., a user ID or session token) from mobile application 115 installed on mobile device 110. The user identifying information can be sent to system 200 by mobile device 110 upon initiating or opening mobile application 115, or upon user authentication. Mobile application 115 can be downloaded using a link provided to the user by a designated user. The designated user can be pre-selected by the diseased person. For example, the designated user can be an estate administrator or guardian.

At block 310, matching module 210 can match a user associated with mobile application 115 to burial site 105 based on the user identifying information that was received at block 305. The matching can be performed, for example, by searching records of the lookup table. The result of matching can include, for example, retrieval of location data or ID of burial site 105.

At block 315, receiving module 205 can receive location data from mobile device 110 or mobile application 115. As discussed above, the location data is the current geographical coordinates of mobile device 110 such as GPS coordinates.

At block 320, processing module 215 can make a determination as to whether mobile device 100 is within predetermined geofence 135 associated with the location of burial site 105. As explained above, the determination is made based on the comparison of the location data of mobile device 110 to coordinates of geofence 135. If mobile device 100 is not within predetermined geofence 135, method 300 returns to block 315. Otherwise, if mobile device 100 is within predetermined geofence 135, method 300 proceeds to block 330.

At block 330, alerting module 225 can provide at least one alert signal via mobile application 115 or mobile device 110 to the user. The alert signals are designed to indicate approaching the location of burial site 105 to the user in visual, acoustic, or tactile form.

At block 335, navigation module 220 provides the user with a guidance to the location of burial site 105. The guidance can be presented to the user through or by mobile application 115. The guidance can include any suitable visual or acoustic information such as a digital map, navigation data, directions, and the like.

At block 340, mobile application 110 causes digital legacy module 230 to retrieve, access, or download a digital legacy of the deceased person associated with burial site 105. The digital legacy can be retrieved in response to a user search, a user request, or automatically, upon determining at block 320 that mobile device 110 is within the predetermined geofence 135. In certain embodiments, the digital legacy includes at least one of the following: an in memoriam, a memorial profile of the deceased person, media associated with the deceased person, social information associated with the deceased person, an image, a video, a comment, a quote, an obituary, a social interaction, a social network profile, and a biography. The digital legacy can be created by one or more people such as by the deceased person while still alive, an individual designated or appointed by the deceased person while still alive, a family member, a friend, and so forth. The digital legacy can be stored in database or memory 240. The digital legacy can be edited anytime and shared with others via social media, website 140, mobile application 115, or other reasonable means. Mobile application 115 and system 200 can be also configured to allow the user to search the digital legacy of the deceased person based on search criteria.

At optional block 345, visualizing module 235 can visualize the location of burial site 105 of the deceased person using mobile application 105. The location of burial site 105 can be visualized as an avatar associated with the deceased person. The avatar is visualized via the mobile application using AR techniques against the natural background of the burial site.

Figure 4:
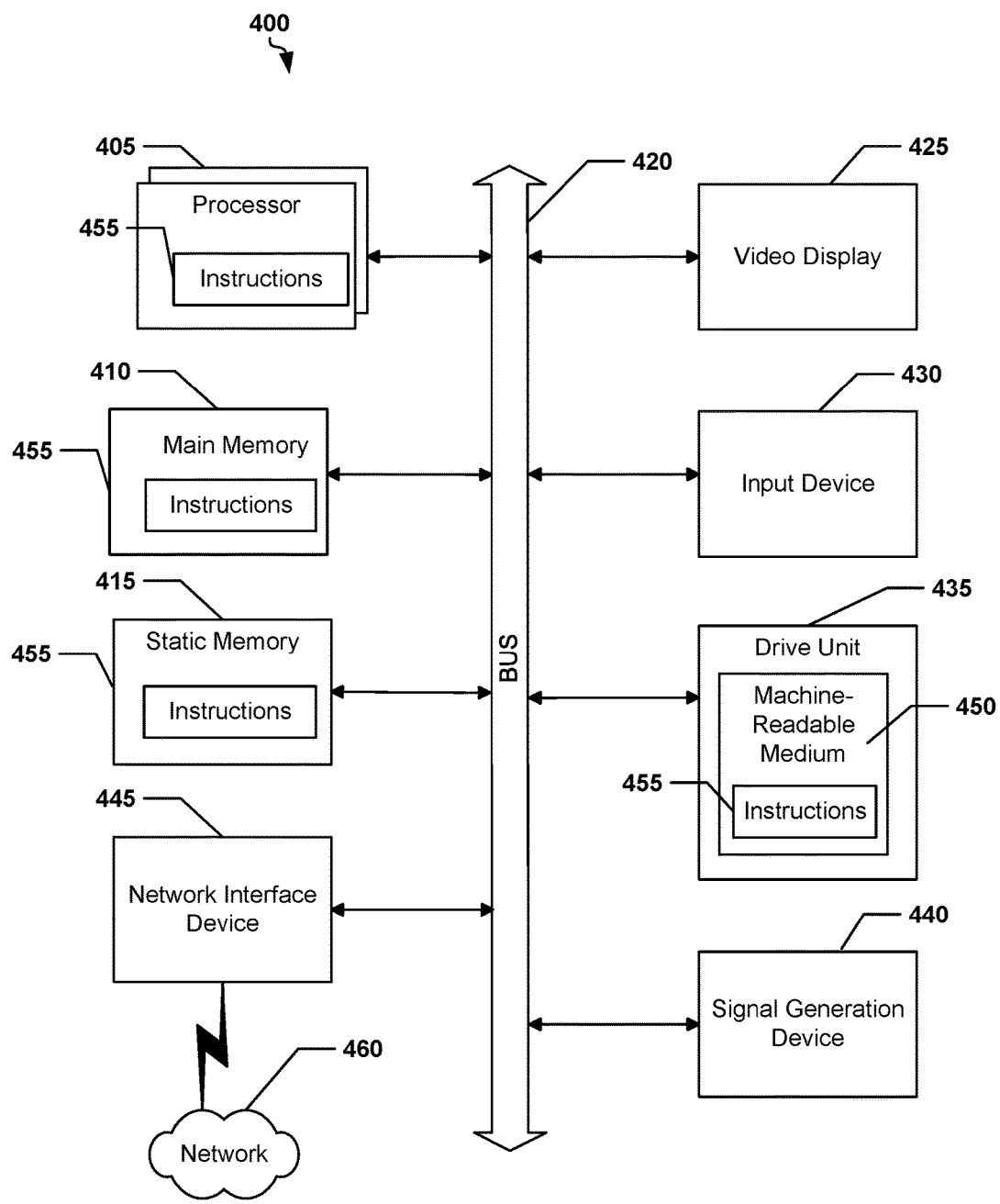
FIG. 4 is a diagrammatic representation of an example machine in the form of a computer system within which a set of instructions for the machine to perform any one or more of the methodologies discussed herein is executed.

FIG. 4 shows a diagrammatic representation of a computing device for a machine in an example electronic form of a computer system 400, within which a set of instructions for causing the machine to perform any one or more of the methods discussed herein can be executed. In example embodiments, the machine operates as a standalone device, or it can be operatively connected or networked to other machines. In a networked deployment, the machine can operate in the capacity of a server, a client machine in a server-client network environment, or as a peer machine in a peer-to-peer (or distributed) network environment. The machine can be a PC, tablet PC, laptop PC, desktop PC, server, cellular telephone, smart phone, or any machine capable of executing a set of instructions that specify actions to be taken by that machine. As such, machine shown in FIG. 4 can represent hardware implementation of mobile device 110, eternal legacy system 120, and system 200. Further, while only a single machine is illustrated, the term "machine" shall also be taken to include any collection of machines that separately or jointly execute a set (or multiple sets) of instructions to perform any one or more of the methodologies discussed herein.

The example computer system 400 includes a processor or multiple processors 405 (e.g., a CPU, a graphics processing unit (GPU), or both), a main memory 410, and a static memory 415, which communicate with each other via a bus 420. Computer system 400 can further include a video display unit 425 (e.g., a liquid crystal display). Computer system 400 also includes at least one input device 430, such as an alphanumeric input device (e.g., a keyboard, keypad, remote control, graphical user interface, etc.), a cursor control device (e.g., a mouse), a microphone, a digital camera, a video camera, and so forth. Computer system 400 also includes a disk drive unit 435, a signal generation device 440 (e.g., a speaker, vibration device for haptic feedback), and a network interface device 445.

Drive unit 435 (also referred to as the disk drive unit 435) includes a machine-readable medium 450 (also can be referred to as a computer-readable medium 450), which stores one or more sets of instructions and data structures (e.g., instructions 455) embodying or utilized by any one or more of the methodologies or functions described herein. Instructions 455 can also reside, completely or at least partially, within the main memory 410 and/or the processors 405 during execution thereof by computer system 400. Main memory 410 and processors 405 also constitute machine-readable media.

Instructions 455 can further be transmitted or received over a communications network 460 via network interface device 445 utilizing one or more transfer protocols (e.g., Hyper Text Transfer Protocol (HTTP), Serial, and Modbus). Communications network 460 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, Digital Data Service (DDS) connection, Digital Subscriber Line (DSL) connection, Ethernet connection, Integrated Services Digital Network (ISDN) line, cable modem, Asynchronous Transfer Mode (ATM) connection, or a Fiber Distributed Data Interface (FDDI) or Copper Distributed Data Interface (CDDI) connection. Furthermore, communications also include links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, GPS, cellular digital packet data (CDPD), Research in Motion, Limited (RIM) duplex paging network, Bluetooth™ radio, or an IEEE 802.11-based radio frequency network.

While machine-readable medium 450 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, RAM, ROM, and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the methods and systems for providing location services for a burial site have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for providing location services for a burial site, the method comprising:
   receiving user identifying information from a mobile application installed on a mobile device;
   matching, based on the user identifying information, a user associated with the mobile application to the burial site;
   receiving location data from the mobile device;
   based on the location data, determining that the mobile device is within a predetermined geofence associated with a location of the burial site;
   based on the determination, providing the user, via the mobile application, with a guidance to the location of the burial site;
   automatically retrieving, via the mobile application, a digital legacy of a deceased person associated with the burial site upon determination that the mobile device is within the predetermined geofence associated with the location of the burial site; and
   visualizing, via the mobile application, the location of the burial site of the deceased person as an avatar of the deceased person.

2. The method of claim 1, further comprising:
receiving from the user, via the mobile application, a request for directions to the location of the burial site while located outside the geofence; and
providing the user, via the mobile application, the directions to the burial site.

3. The method of claim 1, further comprising:
receiving, from the user, a request to perform a search for the location of the burial site based on predetermined search criteria, wherein the request includes the predetermined search criteria;
performing the search; and
providing search results, the search results including the location of the burial site.

4. The method of claim 3, wherein the predetermined search criteria include at least one of the following: a name, a date of death, a date of birth, a name of a cemetery, and a geographical location.

5. The method of claim 1, further comprising providing an ability to search the digital legacy of the deceased person based on search criteria provided by the user.

6. The method of claim 1, wherein the mobile application is downloaded using a link provided to the user by a designated user, the designated user being pre-selected by the deceased person during the lifetime of the deceased person.

7. The method of claim 1, wherein the avatar is visualized via the mobile application using Augmented Reality (AR) techniques against a natural background of the burial site.

8. The method of claim 1, wherein a land at the location of the burial site is purchased from an operator of the burial site by the deceased person during the lifetime of the deceased person.

9. The method of claim 1, wherein the burial site is associated with Global Positioning System (GPS) coordinates, the predetermined geofence being a perimeter of an area enclosing the location of the burial site.

10. The method of claim 1, wherein the predetermined geofence is within a certain distance of the location of the burial site.

11. The method of claim 1, further comprising, based on the determination that the mobile device is within the geofence, providing at least one alert via the mobile application, the at least one alert being indicative of approaching the location of the burial site.

12. The method of claim 1, wherein the digital legacy includes at least one of the following: an in memoriam, a memorial profile of the deceased person, media associated with the deceased person, social information associated with the deceased person, an image, a video, a comment, a quote, an obituary, a social interaction, a social network profile, and a biography.

13. A system for providing location services for a burial site, the system comprising:
a receiving module configured to receive:
user identifying information from a mobile application installed on a mobile device; and
location data from the mobile device;
a matching module configured to match, based on the user identifying information, a user associated with the mobile application to the burial site;
a processing module configured to determine based on the location data that the mobile device is within a predetermined geofence associated with a location of the burial site;
a navigation module configured to provide to the user, based on the determination that the mobile device is within the predetermined geofence, via the mobile application, with a guidance to the location of the burial site;
a digital legacy module configured to automatically retrieve, via the mobile application, a digital legacy of a deceased person associated with the burial site upon determination that the mobile device is within the predetermined geofence associated with the location of the burial site; and
a visualizing module configured to visualize, via the mobile application, the location of the burial site of the deceased person as an avatar of the deceased person.

14. The system of claim 13, further comprising an alerting module to provide via the mobile device, based on the determination that the mobile device is within the geofence, at least one alert being indicative of approaching the location of the burial site.

15. The system of claim 13, wherein the avatar is visualized via the mobile application using Augmented Reality (AR) techniques against a natural background of the burial site.

16. A method for providing location services for a burial site, the method comprising:
receiving user identifying information from a mobile application installed on a mobile device;
matching, based on the user identifying information, a user associated with the mobile application to the burial site;
receiving location data from the mobile device;
based on the location data, determining that the mobile device is within a predetermined geofence associated with a location of the burial site;
based on the determination that the mobile device is within the geofence, providing at least one alert via the mobile application, the at least one alert being indicative of approaching the location of the burial site;
providing the user, via the mobile application, with a guidance to the location of the burial site;
automatically retrieving, via the mobile application, a digital legacy of a deceased person associated with the burial site upon determination that the mobile device is within the predetermined geofence associated with the location of the burial site; and
visualizing, via the mobile application, the location of the burial site of the deceased person as an avatar of the deceased person, wherein the avatar is visualized via the mobile application using Augmented Reality (AR) techniques against a natural background of the burial site.

* * * * *